(12) United States Patent
Roehm et al.

(10) Patent No.: US 7,879,479 B2
(45) Date of Patent: Feb. 1, 2011

(54) BATTERY PACK UTILIZING INTEGRALLY JOINED LOCKING AND HOLDING MEANS

(75) Inventors: Heiko Roehm, Stuttgart (DE); Daniel Hirt, Kirchentellinsfurt (DE)

(73) Assignee: Robert Bosch GmbH, Stuttgart (DE)

( * ) Notice: Subject to any disclaimer, the term of this patent is extended or adjusted under 35 U.S.C. 154(b) by 591 days.

(21) Appl. No.: 11/695,994

(22) Filed: Apr. 3, 2007

(65) Prior Publication Data

US 2007/0243458 A1   Oct. 18, 2007

(30) Foreign Application Priority Data

Apr. 7, 2006  (DE) ..................... 10 2006 018 010

(51) Int. Cl.
*H02J 7/00* (2006.01)
(52) U.S. Cl. .............................. 429/97; 429/96; 429/98; 320/113
(58) Field of Classification Search ............... 320/113; 292/80, 81, 83, 84, 85, 87, 89, DIG. 11; 429/96, 97, 98
See application file for complete search history.

(56) References Cited

U.S. PATENT DOCUMENTS

| | | | | |
|---|---|---|---|---|
| 4,113,217 | A * | 9/1978 | O'Connell | 248/222.11 |
| 4,435,630 | A * | 3/1984 | Jordan | 219/98 |
| 4,810,204 | A * | 3/1989 | Wilson | 439/343 |
| 6,168,881 | B1 * | 1/2001 | Fischer et al. | 429/97 |
| 6,181,032 | B1 * | 1/2001 | Marshall et al. | 307/150 |
| 6,357,534 | B1 | 3/2002 | Buetow et al. | |
| 6,376,942 | B1 | 4/2002 | Burger et al. | |
| 6,566,005 | B1 * | 5/2003 | Shimma et al. | 429/148 |
| 6,729,413 | B2 | 5/2004 | Turner et al. | |
| 6,729,414 | B2 * | 5/2004 | Cooper et al. | 173/217 |
| 6,729,415 | B1 * | 5/2004 | Huang | 173/217 |
| 6,840,335 | B1 * | 1/2005 | Wu | 173/217 |
| 6,955,549 | B2 * | 10/2005 | Brazell et al. | 439/160 |
| 7,121,854 | B2 * | 10/2006 | Buck et al. | 439/160 |
| 7,157,180 | B2 * | 1/2007 | Lui et al. | 429/100 |
| 7,243,734 | B2 * | 7/2007 | Wu | 173/217 |
| 2002/0160255 | A1 * | 10/2002 | Babcock et al. | 429/97 |
| 2003/0039880 | A1 * | 2/2003 | Turner et al. | 429/97 |
| 2004/0072064 | A1 * | 4/2004 | Turner et al. | 429/97 |
| 2004/0197175 | A1 * | 10/2004 | Turner et al. | 414/416.09 |
| 2007/0236178 | A1 * | 10/2007 | Roehm et al. | 320/115 |
| 2007/0238011 | A1 * | 10/2007 | Matthias | 429/97 |
| 2007/0238012 | A1 * | 10/2007 | Matthias | 429/97 |
| 2007/0238333 | A1 * | 10/2007 | Roehm et al. | 439/131 |
| 2007/0238368 | A1 * | 10/2007 | Hirt | 439/716 |
| 2009/0011325 | A1 * | 1/2009 | Agehara et al. | 429/98 |

FOREIGN PATENT DOCUMENTS

CN   1406699   4/2003

(Continued)

*Primary Examiner*—Edward Tso
*Assistant Examiner*—Manuel Hernandez
(74) *Attorney, Agent, or Firm*—Michael J. Striker

(57) ABSTRACT

A battery pack for an electric appliance has a base body, a locking element that is movable relative to the base body, is provided for locking the base body to the electric appliance, and has a locked position, and a holding element, which is provided to maintain the locked position when the base body is in the locked state. The holding element is integrally joined to the locking element.

10 Claims, 2 Drawing Sheets

FOREIGN PATENT DOCUMENTS

| | | |
|---|---|---|
| DE | 101 24 537 | 2/2002 |
| EP | 1 289 032 | 3/2003 |
| GB | 2 302 202 | 1/1997 |
| JP | 63088749 A * | 4/1988 |
| WO | WO 2007014840 A2 * | 2/2007 |

* cited by examiner

BATTERY PACK UTILIZING INTEGRALLY JOINED LOCKING AND HOLDING MEANS

CROSS-REFERENCE TO A RELATED APPLICATION

The invention described and claimed hereinbelow is also described in German Patent Application DE 102006018010.0 filed on Apr. 7, 2006. This German Patent Application, whose subject matter is incorporated here by reference, provides the basis for a claim of priority of invention under 35 U.S.C. 119(a)-(d).

BACKGROUND OF THE INVENTION

The invention is based on a battery pack for an electric appliance.

A battery pack for a handheld power tool is known, which can be locked to a grip of the handheld power tool. In order to lock the battery pack, it is provided with a plastic catch, which engages in detent fashion in a detent recess of the handheld power tool when the battery pack is in the locked state. The battery pack is also provided with a metal spring that holds the plastic catch in its locked position by means of a compressive force.

SUMMARY OF THE INVENTION

A battery pack for an electric appliance in accordance with the present invention has a base body; a locking means, which can be moved relative to the base body, is for locking the base body to the electric appliance, and has a locking position; and a holding means, which is provided to maintain the locking position when the base body is in the locked state.

According to one proposal, the holding means is embodied as integrally joined to the locking means. This permits advantageous savings on components and space and makes it possible to achieve a simple assembly. For example, the holding means is embodied as a resilient element, e.g. made of metal or plastic, onto which the locking means is integrally formed.

Preferably, the holding means is comprised of the locking element, which makes it possible to achieve a particularly compact design of the battery pack. In this case, the locking means can advantageously be held in the locked position by means of inherent force. A holding of the locking means in the locked position by means of an "inherent force" should be understood in this context to particularly mean a holding of the locking means by a reaction force of the locking means; the reaction force counteracts a force, which is exerted on the locking means and tends to move the locking means out of the locked position.

Preferably, the locking means is embodied in the form of a spring element. This makes it possible to use conventional, inexpensive locking means and makes it particularly easy to achieve a holding of the locking means in the locked position by means of an inherent force, which is embodied in the form of a restoring force.

According to a proposed preferred embodiment of the invention, the locking means is embodied in the form of a metallic spring element, which makes it possible to achieve a particularly sturdy and durable locking means.

In this connection, according to another proposed embodiment, the spring element is prestressed in the locked position when the base body is in the locked state, which makes it easily possible to achieve an effective holding of the locking means in its locked position by means of a powerful inherent holding force. Alternatively, the spring element can be in a relaxed state in the locked position.

According to another proposed embodiment, the spring element is embodied as a flexion spring, which permits the use of an in particular conventional, inexpensive, and easy-to-install spring element. For example, the spring element is embodied in the form of a leaf spring.

According to an advantageous proposed embodiment of the invention, the spring element has a detent shape that makes it easily possible to achieve a particularly secure holding of the spring element in its locked position.

In a modification of the invention, the battery pack has an actuating device for actuating the locking means out of the locked position; the locking means engages in the actuating device. This makes it possible to achieve a compact embodiment of the battery pack by reducing the amount of space required. For example, the actuating device has a subregion that is embodied in the form of a shell in which the locking means is at least partially situated. This makes it possible to easily achieve an advantageous protection of the locking means. For example, the actuating device has an actuating element embodied in the form of a button that constitutes part of the shell.

Alternatively or in addition, the actuating device can engage in the locking means, thus advantageously permitting additional space savings. If the locking means is embodied as a sheet metal component, e.g. as a sheet metal spring, then a region of the sheet metal component can be provided with a recess in which the actuating device can engage, thus enabling savings of structural material. If the actuating device engages in the locking means and the locking means engages in the actuating device, then it is possible to achieve a particularly compact embodiment of the battery pack.

According to another proposed embodiment of the invention, the battery pack includes an actuating device for actuating the locking means out of the locked position, which device has a sliding surface for a sliding of the locking means. This makes it possible to achieve a holding of the locking means by the actuating device and still permit a low-friction movement of the locking means relative to the actuating device. The sliding surface can also be used to transmit a movement of the actuating device to the locking element. To this end, the locking element preferably has a rounded region against which the actuating device can slide when actuated.

In a proposed modification of the invention, the battery pack has an actuating device for actuating the locking means out of the locked position, which device is situated on the base body in pivoting fashion. This makes it possible to achieve a structurally simple locking and unlocking mechanism.

According to another proposed embodiment, the battery pack has an actuating device for actuating the locking means out of the locked position; the locking means is connected to the actuating device by means of a form-locked engagement. This makes it possible to achieve a simple assembly.

The battery pack can also have an actuating device for actuating the locking means out of the locked position, which device is integrally joined to the locking means, thus enabling savings on parts, space, and assembly cost.

The assembly of the battery pack can also be simplified if the locking means is fastened to the base body by means of a form-locked engagement. For example, the locking means has a fastening means that is provided to produce a detent connection to the base body and/or the actuating device.

According to another proposed embodiment, the battery pack has a contiguous surface that constitutes at least one receiving region for receiving an electric appliance connecting means of the electric appliance and has an opening in which the locking means is situated in the locked position. This makes it possible to achieve a particularly compact embodiment of the battery pack. Preferably, an electrical contact element for producing an electrical connection with the electric appliance connecting means is situated in the receiving region.

An electric appliance is also proposed, in particular a power tool, having an electric appliance base body, e.g. a grip. This electric appliance advantageously has a battery pack that is detachable from the electric appliance base body, said battery pack having a base body; having a locking means, which can be moved relative to the base body, is provided for locking the base body to the electric appliance base body, and has a locked position; and having a holding means that is provided for maintaining the locked position when the base body is in the locked state; the holding means is integrally joined to the locking means. This makes it easy to save on parts and space.

Other advantages ensue from the following description of the drawings. The drawings show exemplary embodiments of the invention. The drawings, the description, and the claims contain numerous features in combination. Those skilled in the art will also suitably consider the features individually and unite them into other meaningful combinations.

DESCRIPTION OF THE PREFERRED EMBODIMENTS

Figure 1:
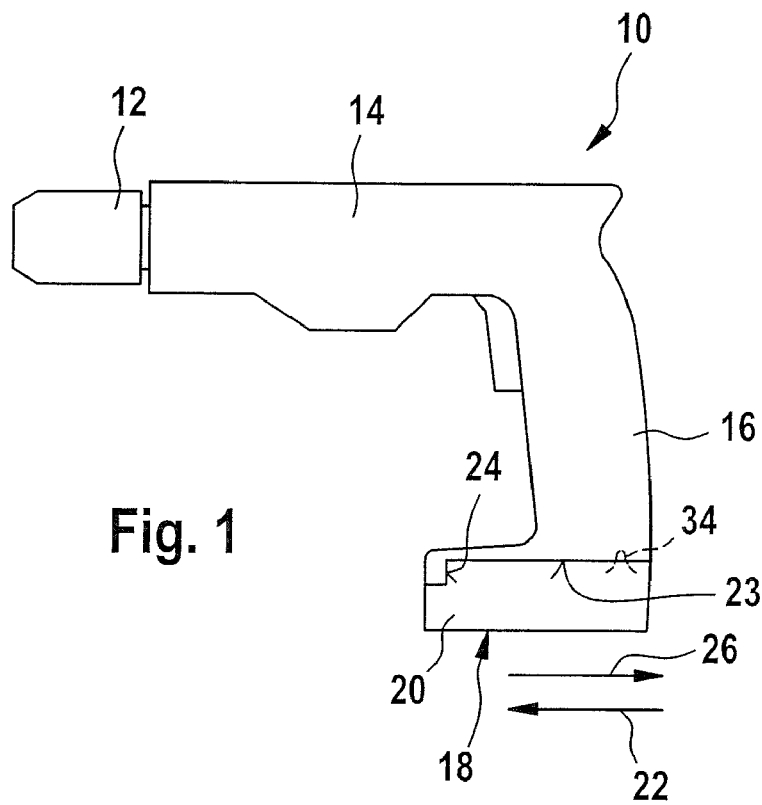
FIG. 1 shows a cordless power screwdriver with a grip and a battery pack locked to the grip in accordance with the present invention.

FIG. 1 shows an electric appliance 10 embodied in the form of a handheld power tool. The handheld power tool is embodied in the form of a cordless power screwdriver. It has an electric appliance base body 14 to which a tool holder fitting 12 is fastened. The electric appliance base body 14 also comprises a grip 16 to which a battery pack 18 is locked.

The battery pack 18 has a base body 20, which in particular has a battery pack housing of the battery pack 18. The battery pack 18 is embodied as a sliding battery pack. In order to lock the battery pack 18 to the grip 16, the base body 20 is slid in a sliding direction 22 along the grip 16, namely along a lower outer surface 23 of the grip 16 extending essentially perpendicular to the longitudinal direction of the grip 16, until the base body 20 strikes against a surface 24 of the grip 16. Once it reaches this position, the battery pack 18 is locked to the grip 16 by a locking means 34. In its depicted locked position, this locking means 34 is engaged in detent fashion in a detent recess, not shown in detail, of the grip 16. Through actuation of an actuating device 36 (FIG. 2), the battery pack 18 can be unlocked from the electric appliance 10.

After the battery pack 18 is unlocked, the base body 20 can be detached from the electric appliance 10, namely by sliding the base body 20 in a removal direction 26 along the lower outer surface 23 of the grip 16. The sliding direction 22 and the removal direction 26 are oriented essentially perpendicular to the longitudinal direction of the grip 16. The base body 20, which in particular includes the battery pack housing, can also have a component that is mounted in this battery pack housing and can be detached from the battery pack housing, which serves to fasten at least one functional component, e.g. the locking means 34 or elements of the actuating device 36, etc., to the battery pack housing.

Figure 2:
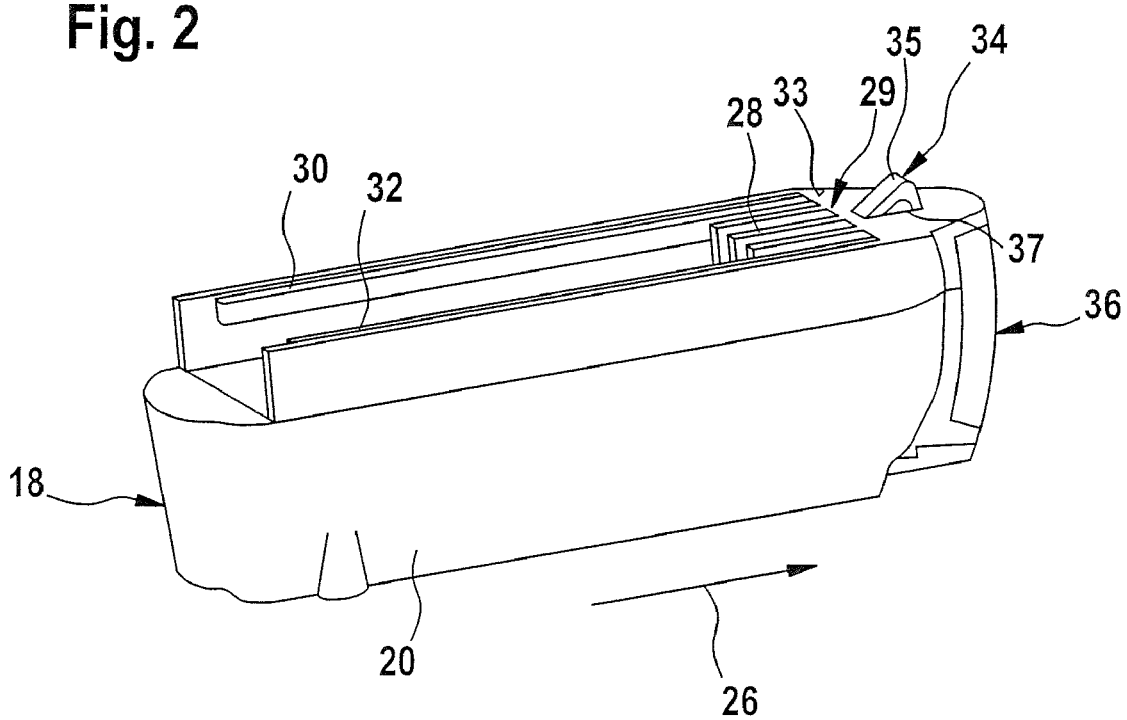
FIG. 2 is a perspective view of the battery pack from FIG. 1 in accordance with the present invention.

FIG. 2 is a perspective view of the battery pack 18. The drawing shows the base body 20 and the locking means 34. The battery pack housing of the base body 20 has a surface 33. This surface 33 in particular has an opening 37 from which a detent shape 35 of the locking means 34 protrudes. In the locked state of the battery pack 18, the surface 33 rests against the grip 16. This surface 33 extends farther in the longitudinal direction of the base body 20 than the upper surface of a contact holding means 28. This contact holding means 28 serves to hold conductive contact elements, not shown in detail, provided for producing an electrical contact between the electric appliance 10 and storage cells (not shown) situated in the base body 20.

The surface 33 has slot-shaped receiving regions 29 for receiving electrical connecting means of the electric appliance 10. When the base body 20 is slid along the grip 16, the connecting means of the electric appliance 10 engage in the receiving regions 29 in which they come into contact with the contact elements of the battery pack 18. The base body 20 is also provided with a guide means that is embodied in the form of two guide rails 30 and 32. These are integrally formed onto a wall of the base body 20. When the base body 20 is slid along the grip 16, the guide rails 30, 32 each engage in a recess of the grip 16, producing a groove/spring connection with the grip 16. In the process of this, the base body 20 is supported by the grip 16, preventing the battery pack 18 from being dropped as it is guided along the grip 16. In order to unlock the battery pack 18 from the grip 16, the battery pack 18 is provided with an actuating device 36. The unlocking mechanism will be described in conjunction with FIG. 3.

Figure 3:
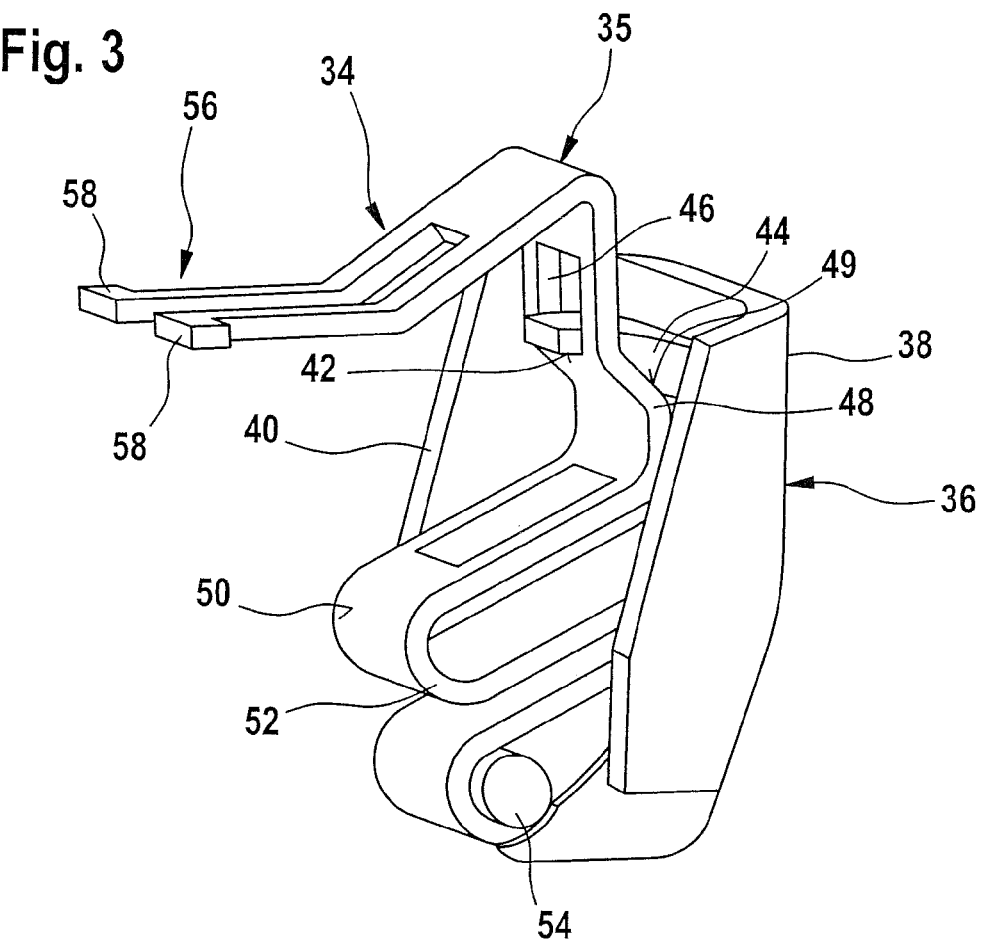
FIG. 3 shows a locking means and an actuating device of the battery pack from FIG. 1 in accordance with the present invention.

FIG. 3 shows the locking means 34 and the actuating device 36. The locking means 34 is embodied in the form of a metal flexion spring serving as a spring element. It has a subregion 56 that is embodied in the form of two arms. When the locking means 34 is mounted on the base body 20, the subregion 56 engages in the base body 20. In order to fasten the locking means 34 to the base body 20, each of the arms of the subregion 56 has a respective fastening element 58 at its end, which is embodied as a detent element in the form of a hook integrally formed onto the arm. Adjacent to the subregion 56, the drawing shows the detent shape 35 of the locking means 34.

In the mounted state, this detent shape 35 protrudes out from the surface 33 as shown in FIG. 2 and in the locked state of the battery pack 18, engages in detent fashion in a detent recess of the grip 16 (see FIG. 1). At a free end, the locking means 34 also has a rounded subregion 52 that constitutes a sliding surface 50. This sliding surface 50 rests against the base body 20 in the mounted state.

In order to actuate the locking means 34 out of its locked position shown in FIG. 1, the battery pack 18 is provided with an actuating device 36. To this end, the actuating device 36 has an actuating element 38, which is embodied in the form of a pushbutton. The actuating element 38 has a subregion 40, which is embodied in the form of a shell. The locking means 34 engages in this shell. In the mounted state, the actuating element 38 is situated on the base body 20 in pivoting fashion. To this end, the actuating element 38 has a pivot axle 54, which in the mounted state, is supported in a pivot bearing of the base body 20 (not shown). In addition, a strut 44 is integrally formed onto the actuating element 38.

The strut 44 engages in a recess 46 of the locking means 34, which recess is adjacent to the detent shape 35. The strut 44 can transmit a movement, namely a pivoting movement of the actuating element 38 in this example, to the locking means 34. To this end, the strut 44 has a lower outer surface, which is embodied in the form of a sliding surface 42 for a sliding action of the locking means 34. The locking means 34 has a rounded subregion 48, which constitutes a sliding surface 49 that rests against the sliding surface 42 of the strut 44. If a user presses on the actuating element 38 embodied in the form of a pushbutton, e.g. in the sliding direction 22, then the pivoting movement of the actuating element 38 that this triggers causes the sliding surface 42 of the strut 44 to slide against the sliding surface 49 of the locking means 34, thus exerting a compressive force on the sliding surface 49.

This causes a part of the locking means 34, namely the detent shape 35 and the subregions 48 and 52, to move in the direction of the pivot axle 54 of the actuating element 38 relative to the base body 20. In the process of this, the sliding surface 50 slides against a surface, not shown, of the base body 20. Starting from the locked state of the battery pack 18 shown in FIG. 1, this actuation of the actuating element 38 can move the detent shape 35 out of its locked position; the detent shape 35 is moved into the surface 33 of the base body 20.

When the battery pack 18 is in the locked state, the locking means 34 is prestressed in the locked position shown in FIG. 1. Alternatively, the locked position could correspond to a relaxed state of the locking means 34. In both cases, the locking means 34 is held in the locked position by inherent force. If the actuating element 38 is actuated with an actuating force, the subregion 56 that is fastened to the base body 20 remains in its position while the detent shape 35 and the subregions 48 and 52 are moved downward. As a result, the actuation causes a deformation of the locking means 34 and generates a restoring force that tends to counteract the actuating force and therefore to keep the locking means 34 in the locked position. For this reason, the locking means 34 is also embodied as a holding means for maintaining the locked position; this makes it unnecessary to provide an additional holding means for keeping the locking means 34 in its locked position.

Figure 4:
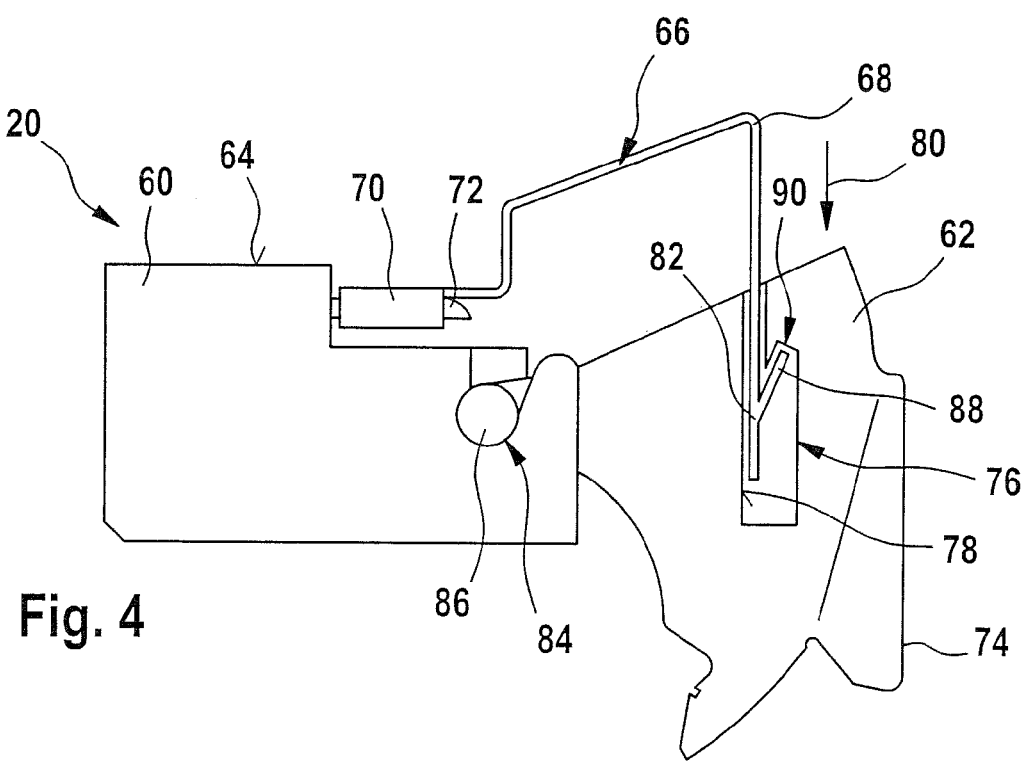
FIG. 4 shows an alternative actuating unit for the battery pack from FIG. 1 in accordance with the present invention.

FIG. 4 shows an alternative exemplary embodiment of a subregion 60 of the base body 20 of the battery pack 18 and an actuating device 62. The drawing also shows a locking means 66 that is provided for locking the base body 20 to the electric appliance 10. The subregion 60 of the base body 20 can be integrally joined to the battery pack housing or it can be a component, which is mounted in the battery pack housing, is detachable from the battery pack housing, and serves to fasten the locking means 66 and the actuating device 62 to the battery pack housing. The locking means 66 has a detent shape 68, which, in the locked position shown in FIG. 1, is engaged in detent fashion in a detent recess of the grip 16 (not shown in FIG. 1). The locking means 66 is embodied in the form of a flexion spring, namely a metallic leaf spring, that functions as a spring element.

In the locked position from FIG. 1, the spring element is detent engaged in the grip 16 in a prestressed fashion. At one end, the locking means 66 has a fastening means 70, which embraces a section 72 of the subregion 60 embodied in the form of a rib. During an assembly of the battery pack 18, the fastening means 70 engages around the section 72, producing a form-locked attachment of the locking means 66 to the base body 20.

The actuating device 62 is embodied in the form of a pushbutton. It has an actuating region 74 for the actuation of the actuating device 62 by a user. The locking means 66 engages in a slot 76 of the actuating device 62. This slot 76 also comprises a sliding surface 78. When the detent shape 68 is pushed toward the bottom of the base body 20, namely in the direction 80, the detent shape 68 is moved relative to the actuating device 62. As a result, an end 82 of the locking means 66 slides against the sliding surface 78 of the actuating device 62. This pushing action is produced, for example, by a sliding of the battery pack 18 into its locked state in which the lower outer surface 23 of the grip 16 pushes the detent shape 68 in the direction 80 until the detent shape 68 engages in detent fashion in the grip 16.

In addition, the actuating device 62 is attached to the subregion 60 of the base body 20. To this end, the subregion 60 has a recess 84 in which a section 86 of the actuating device 62 engages in detent fashion. It is thus possible to achieve a toolless fastening of the actuating device 62 to the base body 20. The actuating device 62 is also situated on the base body 20 in pivoting fashion. To this end, the section 86 is embodied as a pivot axle and the recess 84 is embodied as a pivot bearing. When the actuating region 74 is actuated, namely through the exertion of a compressive force by the user, the actuating device 62 is pivoted around its pivot axle.

This pivoting movement carries the end 82 of the locking means 66 along with it. To this end, the locking means 66 is provided with a holding means 88, which is embodied in the form of a strut branching away from the end 82. During an assembly, namely when the end 82 is being guided into the slot 76, the holding means 88 engages in detent fashion in a detent recess 90 of the actuating device 62. The holding means 88 holds the locking means 66 and the detent shape 68 in a desired position relative to the base body 20. In addition, the holding means 88 carries the end 82 along with it during a pivoting movement of the actuating device 62 in the direction 80.

Based on the locked position shown in FIG. 1, it is assumed that in order to unlock the battery pack 18, the user actuates the actuating device 62 with an actuating force on the actuating region 74. As described above, this produces a movement of the detent shape 68 and the end 82 of the locking means 66, thus moving the detent shape 68 out from the grip 16. During this pivoting movement, the other end of the locking means 66 with the fastening means 70 remains affixed to the base body 20, thus bending the locking means 66 that is embodied in the form of a flexion spring.

This generates a restoring force that tends to counteract the actuating force exerted on the actuating region 74 and thus a movement of the detent shape 68 out from its locked position. Consequently, the locking means 66 is also embodied as a holding means for maintaining the locked position, thus making it unnecessary to provide an additional holding means for keeping the locking means 66 in its locked position.

It will be understood that each of the elements described above, or two or more together, may also find a useful application in other types of constructions differing from the type described above.

While the invention has been illustrated and described as embodied in a battery pack, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A battery pack for an electrical appliance, comprising:
a base body;
locking means movable relative to said body for locking said base body to the electrical appliance, said locking means having a locked position;
holding means for maintaining the locked position when said base body is in a locked state, said holding means being integrally joined to said locking means, wherein said holding means is constituted by said locking means, wherein said locking means is configured as a spring element; and
an actuating device for actuating said locking means out of the locked position, said locking means engaging in said actuating device, wherein said actuating device has a pivot axle supported in a pivot bearing of said base body such that the actuating element is situated on the base body in a pivoting manner, wherein said pivot axle is oriented horizontally relative to the base body.

2. A battery pack as defined in claim 1, wherein said locking means is configured as a metallic spring element.

3. A battery pack as defined in claim 1, wherein said spring element is configured as a flexion spring.

4. A battery pack as defined in claim 1, wherein said spring element has a detent shape.

5. A battery pack as defined in claim 1, wherein said actuating device has a sliding surface for a sliding action of said locking means.

6. A battery pack as defined in claim 1, wherein said locking means is connected to said actuating device by a form-locked engagement.

7. A battery pack as defined in claim 1, wherein said locking means is fastened to said base body by a form-locked engagement.

8. A battery pack as defined in claim 1; and further comprising a contiguous surface that constitutes at least one receiving region for receiving an electrical appliance connecting means of the electrical appliance and has an opening in which said locking means is situated in the locked position.

9. An electrical appliance, comprising:
an electrical appliance base body; and
a battery pack that is detachable from said electrical appliance base body, said battery pack including a base body;
locking means movable relative to said battery pack base body for locking said battery pack base body to the electrical appliance, said locking means having a locked position, and holding means for maintaining the locked position when said battery pack base body is in a locked state, said holding means being integrally joined to said locking means, wherein said holding means is constituted by said locking means, wherein said locking means is configured as a spring element; and
an actuating device for actuating said locking means out of the locked position, said locking means engaging in said actuating device, wherein said actuating device has a pivot axle supported in a pivot bearing of said battery pack base body such that the actuating element is situated on the battery pack base body in a pivoting manner, wherein said pivot axle is oriented horizontally relative to the battery pack base body.

10. A battery pack as defined in claim 1, wherein when said battery pack base body is in the locked state, said spring element is stressed in said locked position.

* * * * *